United States Patent
Aoyagi et al.

(10) Patent No.: US 6,801,401 B2
(45) Date of Patent: Oct. 5, 2004

(54) MAGNETIC HEAD DEVICE AND LEAD WIRE

(75) Inventors: Akihiko Aoyagi, Fujisawa (JP); Kenshin Okada, Fujisawa (JP); Hiroyasu Tsuchida, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 398 days.

(21) Appl. No.: 09/872,055

(22) Filed: Jun. 1, 2001

(65) Prior Publication Data

US 2002/0027748 A1 Mar. 7, 2002

(30) Foreign Application Priority Data

Jun. 2, 2000 (JP) ....................................... 2000-165406

(51) Int. Cl.[7] ................................................ G11B 5/48
(52) U.S. Cl. ................................................... 360/245.8
(58) Field of Search ....................... 360/245.8; 174/260

(56) References Cited

U.S. PATENT DOCUMENTS

| | | | |
|---|---|---|---|
| 5,391,842 A | 2/1995 | Bennin et al. ............... | 174/260 |
| 5,530,608 A | * 6/1996 | Aboaf et al. ................. | 360/316 |
| 5,805,382 A | * 9/1998 | Lee et al. .................. | 360/244.1 |
| 5,912,787 A | 6/1999 | Khan et al. .................. | 360/104 |
| 5,986,852 A | 11/1999 | Berg et al. ................... | 360/104 |

FOREIGN PATENT DOCUMENTS

WO    WO 95/16261    6/1995

* cited by examiner

*Primary Examiner*—George J. Letscher
(74) *Attorney, Agent, or Firm*—Ronald B. Feece (57) ABSTRACT

A magnetic head device which can accommodate higher data transfer rates can be implemented by using lead wires. A magnetic head device 1 according to the present invention includes a head slider 3 having a magnetic head 2 having a data reading element and a data writing element, a reading lead RL for transferring data between the data reading element and external devices, the reading lead configured by a pair of lead wires which are twisted together, and a writing lead WL for transferring data between the data writing element and external devices, the writing lead configured by a pair of lead wires which are untwisted but arranged in parallel to each other. Thus, the magnetic head device can accommodate higher data transfer rates by using the writing lead WL configured by a pair of lead wires which are untwisted but arranged in parallel to each other.

11 Claims, 6 Drawing Sheets

MAGNETIC HEAD DEVICE AND LEAD WIRE

FIELD OF THE INVENTION

The present invention relates to a magnetic head device used for a data recording/playing device, for example, a hard disk drive, and in particular, to an improved lead wire for transferring signals to a magnetic head for data reading/writing.

BACKGROUND OF THE INVENTION

A hard disk drive used as an external storage for a computer usually comprises a recording medium for storing data which is called a hard disk and a magnetic head for writing data to or reading data from the hard disk. Conventionally, typical magnetic heads included those of metal in gap (MIG) or thin film type. However, in recent years, a magneto resistive (MR) head which is not susceptible to noise is commonly used.

A magnetic head device comprises a head gimbals assembly (HGA), which principally consists of a slider including a magnetic head element, a load beam on which the slider is arranged at the end thereof, and arm electronics (hereinafter referred to as AE) including a switch for the magnetic head and a preamplifier.

An MR head has separate head elements, one of which is used for reading data (hereinafter referred to as reading element) and the other of which is used for writing data (hereinafter referred to as writing element). In other words, the reading element takes advantage of magneto resistance and the write element is composed of a coil.

A signal from an external device is transferred through the AE to the magnetic head element of the slider. The AE and the magnetic head element are interconnected through an insulation-covered lead wire. The MR head slider usually comprises two reading bonding pads connected to the reading element and two writing bonding pads connected to the writing element. These bonding pads are Au-plated. The lead wire connected to the AE is also connected to each of the bonding pads. That is, the magnetic head element and the AE are interconnected through two lead wires for the reading element and two lead wires for the writing element.

Such a lead wire is typically an insulation-covered wire obtained by forming an Au-plated layer on the surface of a Cu (for example, oxygen-free copper) core wire and forming an insulation cover layer of polyurethane or other material on the outer surface thereof. The Au-plated layer on the surface of the Cu core wire and the Au-plated layer formed on each of the bonding pads for the reading and writing elements are bonded together through pressurization with ultrasonic vibration.

Signals in the magnetic head must have a noise resistance improved through a signal transfer part from the magnetic head to a signal processing circuit, since these signals are much weaker than those in the signal processing circuit. This problem could be eliminated by twisting lead wires together. This solution was based on the expectation that the current flows caused in the lead wires by noise coming into them could be cancelled since they have opposite directions on the twisted lead wires. Alternatively, a tube might be provided between the AE and the slider to contain the lead wires therein and the twisted lead wires could lighten the labor required to insert them into the tube. With conventional MIG or thin film heads, two lead wires were usually twisted together because only one element was employed for both reading and writing.

In an MR head, there are usually four lead wires used for connecting the AE and the magnetic head element as described above. Initially, it was studied that all the four lead wires were twisted together but it was found that desired characteristics could not obtained by doing so. Therefore, the two lead wires for the reading element are twisted together and the two lead wires for the writing element are twisted together.

Prior magnetic head devices using two lead wires twisted together are disclosed in, for example, the Published Unexamined Patent Application Nos. 7-94042, 7-307018, 9-223304, and 11-238215.

Published Unexamined Patent Application No. 7-94042 makes a proposal that an adhesive layer is formed on the outer surface of each lead wire and then two lead wires are fixed by bonding their adhesive layers. This proposal is intended to eliminate the difficulty of keeping the twisted lead wires in conformity to a predetermined specification because the prior magnetic head device disclosed therein uses very fine lead wires with a diameter of several tens $\mu m$ and such a lead wire with a small diameter is difficult to plastically transform and to have firm twists.

Published Unexamined Patent Application No. 7-307018 makes a proposal which may solve the problem that the connections for each lead wire will be difficult to identify individually when the prior magnetic head device disclosed therein is installed on a computer. This proposal is intended to make clear the connections for each lead wire by dividing all lead wires into functional groups.

Published Unexamined Patent Application No. 11-238215 proposes a method for manufacturing lead wires for a magnetic head which can improve the locational accuracy of the end of each lead wire. According to this proposal, lead wires are twisted together and adhesively hardened in part and then the end of the adhesively hardened lead wires is exposed by removing its covering.

As described above, the magnetic head element and the AE are conventionally interconnected through an insulation-covered lead wire. Recently, however, an integral-type conductor lead is proposed for replacing such a lead wire. This is called a trace suspension assembly or integral-type suspension assembly. For example, such an integral-type suspension assembly is disclosed in the publication of Published Unexamined Patent Application No. 10-69623 or National Publication of International Patent Application No. 11-514780.

Such an integral-type suspension assembly has a feature that it allows leads to be formed accurately. This feature matches the need for increasing the data transfer rate for a magnetic head element. Therefore, it may be considered more advantageous to use an integral-type suspension assembly in order to increase the data transfer rate along with higher recording densities of hard disks.

A magnetic head using lead wires has been forecasted to have a limited transfer rate, for example, approximately 300 Mbps. Therefore, a recent magnetic head device typically comprises an integral-type suspension assembly instead of lead wires for interconnecting a magnetic head element and an AE.

As described above, an integral-type suspension assembly is advantageous in characteristics including data transfer rates but it is remarkably disadvantageous in cost as compared with lead wires. As well known to those skilled in the art, the number of required magnetic heads is proportional to the number of hard disks. Therefore, a hard disk drive having many hard disks will result in a considerable cost difference between a magnetic head device using lead wires and another magnetic head device using an integral-type suspension assembly.

Hard disk drives have been mainly used as external storages for computers but now, with increasing storage capacities, other uses are being studied. For example, a recording device is developed to store video data such as TV programs and movies. However, such a recording device has the disadvantage that many hard disks may have to be installed in a hard disk drive used for this purpose, because video data is much larger than IT (Information Technology) data even if the storage capacity of a hard disk has been increased considerably. Nevertheless, such a video data recording device, which is a consumer product, must be provided at lower prices for popularization. Therefore, for some uses other than IT, an integral-type suspension assembly may be unable to be incorporated due to its cost penalty. Lower-cost integral-type suspension assemblies have been developed but so far they have never solved this problem satisfactorily.

SUMMARY OF THE INVENTION

It is, therefore, an object of the present invention to provide a magnetic head device which can accommodate higher data transfer rates by using lead wires.

In a conventional magnetic head device, lead wires connected to a reading element and lead wires connected to a writing element have been made to the same specification. That is, all the lead wires were identical in material and dimension and in addition, those connected to the reading element were twisted together and those connected to the writing element were twisted together. This may be because the characteristics required of each lead wire connected to the reading or writing element with respect to the data transfer rate have never been studied sufficiently. Alternatively, this may be because an integral-type suspension assembly appears with better characteristics than lead wires.

The present inventors have studied a basic question of whether it is appropriate for higher data transfer rates that the lead wires connected to the reading element and those connected to the writing element are made to the same specification. As a result, it is found that twisted lead wires are appropriate for the lead wires connected to the reading element. On the other hand, it is found that untwisted lead wires rather than twisted lead wires can implement the lead wires connected to the writing head for higher data transfer rates. In addition, if the spacing between twisted lead wires is proper, the twisted lead wires for the reading element can accommodate higher data transfer rates more satisfactorily.

The present invention has been devised from the findings described above and provides a magnetic head device comprising a magnetic head slider having a data reading element and a data writing element, a first lead for transferring data between the data reading element and external devices, the first lead consisting of a pair of lead wires which are twisted together, and a second lead for transferring data between the data writing element and external devices, the second lead consisting of a pair of lead wires which are untwisted but arranged in parallel to each other.

The magnetic head device according to the present invention can accommodate higher data transfer rates by using, as the lead for the writing element, a pair of lead wires which are untwisted but arranged in parallel to each other. It is said that the conventional magnetic head device using lead wires has a limited data transfer rate of approximately 300 Mbps. On the contrary, the present invention can provide lead wires adaptable to a data transfer rate of 450 Mbps or higher. This will assume great significance.

In the magnetic head device according to the present invention, the spacing between the paired lead wires constituting the first lead is desirably less than the spacing between the paired lead wires constituting the second lead.

Also in the magnetic head device according to the present invention, each of the paired lead wires constituting the second lead has an insulation cover layer and the paired lead wires can be integrally formed by bonding the respective insulation cover layers. Specifically, the bonding can be accomplished by fused-bonding the insulation cover layers or bonding them with an adhesive. The lead wires may be bonded throughout their lengths or at predetermined intervals.

The data reading element according to the present invention is desirably a magneto resistive element.

Figure 5:
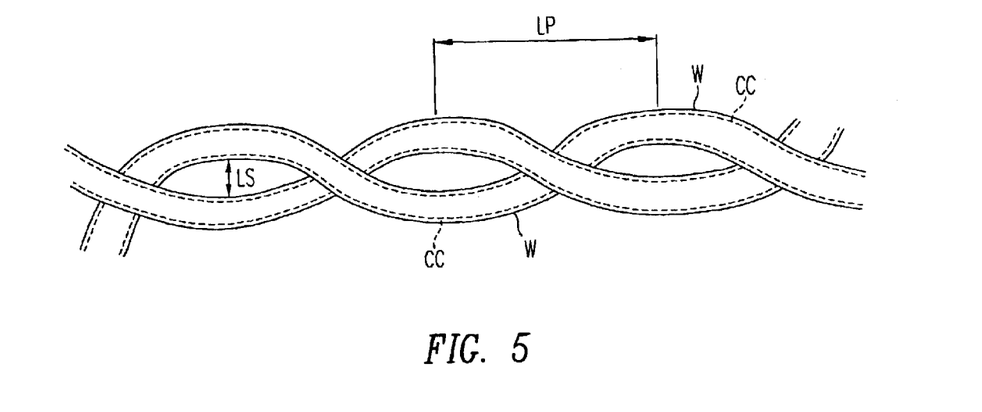
FIG. 5 is a sectional view for showing the configuration of the reading lead wire RW (writing lead wire WW)

The present inventors have found that less spacing between the reading lead wires is more desirable for higher data transfer rates. As described above, the reading lead wires are desirably a pair of lead wires twisted together. The term "spacing" used herein means the distance between the core wires in the twisted lead wires. That is, as shown in FIG. 5, when the distance LS between the core wires CC in the lead wires W is called the spacing, it is desirable that the distance LS is reduced. As an approach to reduce the distance LS, the present invention proposes to thin the insulation layer located on the outer surface of each lead wire. In other words, the present invention provides a magnetic head device for reading data from and writing data to a magnetic recording medium, comprising a reading element for reading data and a reading lead wire for transferring signals between the reading element and external devices, wherein the reading lead wire has a core wire of conductive material and an insulation layer covering the outer surface thereof and having a thickness of 3 μm or less.

In the magnetic head device according to the present invention, a desirable thickness of the insulation layer is 1.5 to 2.5 μm. If the insulation layer is too thin, it may be difficult to ensure that the layer covers the lead wire throughout its length. If so, the conductive material may be partially exposed and cannot perform its function as an insulation layer completely. Therefore, it is desirable that the insulation layer has a thickness of 1.5 μm or more. On the other hand, in order to achieve satisfactory effects of thinning the insulation layer, it is desirable to have a thickness of 2.5 μm or less. The most desirable thickness of the insulation layer is approximately 2.0 μm.

On the contrary, for the writing lead wire, it is desirable to have a thicker insulation layer. That is, to reduce the delay in rise time of a signal, it is effective to decrease the capacitance C of the lead wire. For this purpose, an approach of thickening the insulation layer may be effective. Therefore, in the magnetic head device according to the present invention, it is desirable that it comprises a writing element for writing data and a writing lead wire for transferring signals between the writing element and external devices, and the writing lead wire has a core wire of conductive material and an insulation layer covering the outer surface thereof and having a thickness of 4 μm or more.

The insulation layer for the writing lead wire is desirably 10 μm or less, since the material cost may be increased if the layer is too thick. A more desirable thickness of the insulation layer is 4.5 to 7.5 µm and a still more desirable thickness is 5 to 6 µm.

In the magnetic head device described above, it is desirable that two reading lead wires are twisted together to form a reading lead and two writing lead wires are arranged in parallel to each other to form a writing lead. In that case, the twisting pitch for the reading lead wires is desirably 0.5 mm or less. As described above, it is desirable that the reading lead has a small spacing LS. Such a small spacing LS can be achieved by twisting it heavily. It is effective to achieve a twisting pitch of 0.5 mm for the reading lead through such a heavy twisting. It has been verified that a twisting pitch of 0.5 mm or less may produce a small variation in twisting pitch. It should be appreciated that the twisting pitch is a value defined as LP in FIG. 5.

In general, a high-frequency signal flows along the surface of a conductor in the lead wire. The lead wire in the magnetic head device has a Cu core wire Au-plated on its surface and an insulation cover layer of polyurethane or other material formed on the outer surface of the core wire. However, it is desirable that a signal flows in Cu which is superior to Au in transfer characteristics. This can be achieved by thinning the Au layer. Therefore, the present invention provides a magnetic head device for reading data from and writing data to a magnetic recording medium, comprising a writing element for writing data and a lead wire for transferring signals between the writing element and external devices, wherein the lead wire has a core wire of conductive material, a metal covering layer covering the outer surface of the core wire and having a thickness of 1.5 µm or less for bonding to the writing element, and an insulation layer covering the outer surface of the metal covering layer.

As described above, the metal covering layer is an essential element for bonding to the reading and writing elements. Thus, the thickness of the metal covering layer is desirably 0.5 µm or more for properly bonding to the reading and writing elements. A more desirable thickness of the metal covering layer is 0.8 to 1.2 µm and the most desirable thickness is approximately 1.0 µm.

In the magnetic head device according to the present invention, the core wire is desirably made of Cu material represented by oxygen-free copper or Ag material. Cu core wires are now prevailing but Ag core wires are more advantageous than Cu ones in terms of electrical resistance.

In the above description, the present invention is implemented in a magnetic head device but it is clear that the present invention can be implemented in a lead wire. Therefore, according to the present invention, a lead wire for transferring signals between a data writing element and external devices, comprising a core wire responsible for signal transfer, an Au layer formed on the outer surface of the core wire and having a thickness of 1.5 µm or less, and an insulation layer formed on the outer surface of the Au layer is provided. According to the present invention, a lead wire for transferring signals between a data reading element and external devices, comprising a core wire responsible for signal transfer, an Au layer formed on the outer surface of the core wire, and an insulation layer formed on the outer surface of the Au layer and having a thickness of 3 µm or less is further provided.

DETAILED DESCRIPTION OF THE PREFERRED EMBODIMENTS

Figure 1:
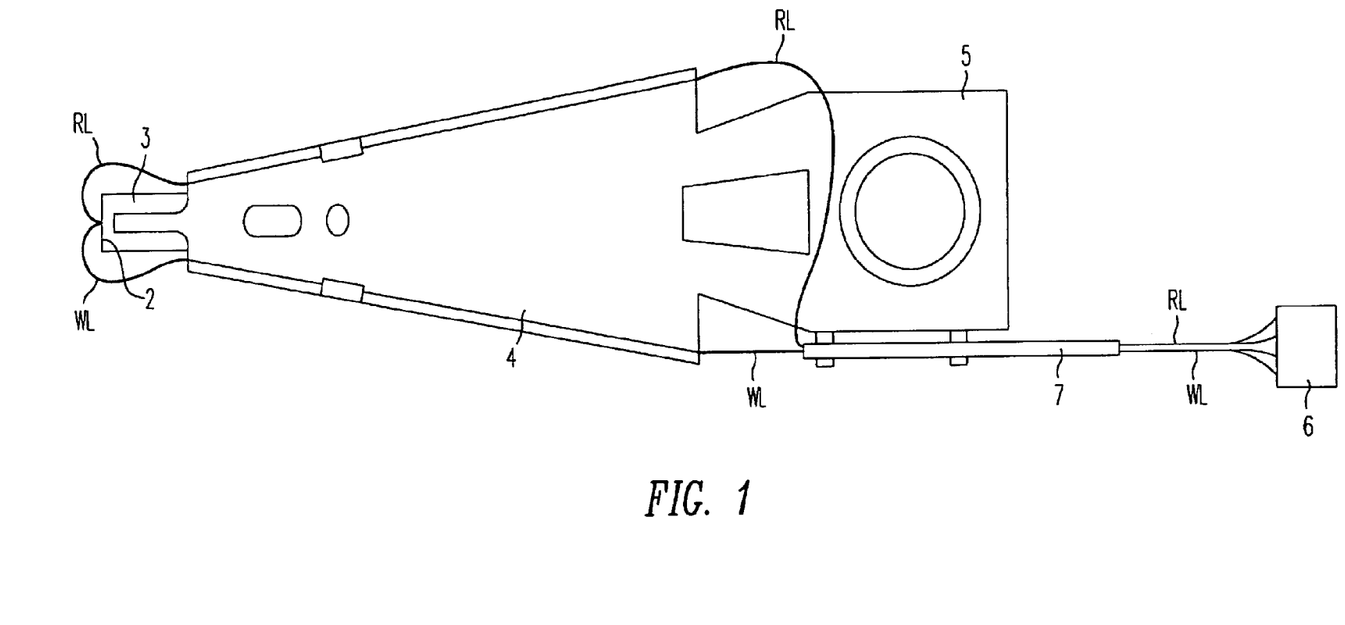
FIG. 1 is a plan view for showing a magnetic head device 1 according to an embodiment of the present invention.

Now, the present invention will be described below with respect to a preferred embodiment thereof. FIG. 1 is a plan view showing a magnetic head device 1 according to this preferred embodiment.

The magnetic head device 1 comprises a head slider 3 having a magnetic head 2 for data reading/writing, a load beam 4, a flexure (not shown) for installing the head slider 3 on the load beam 4, a mount plate 5 provided for the base of the load beam 4, an AE (arm electronics) 6, a reading lead RL and a writing lead WL for transferring signals between the AE 6 and the magnetic head 2, and a tube 7 for guiding the reading lead RL and the writing lead RL.

Figure 2:
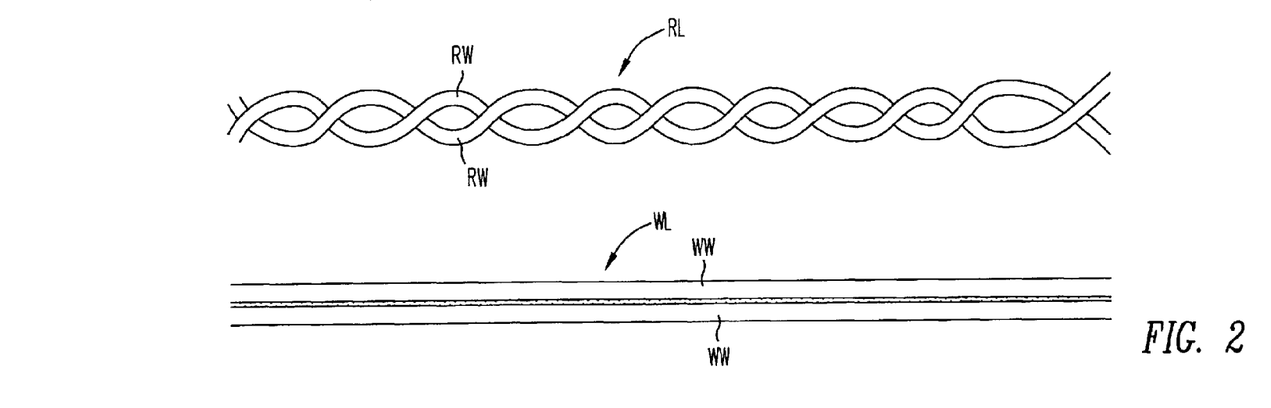
FIG. 2 is an enlarged view for showing in part a reading lead RL and a writing lead WL.

FIG. 2 is an enlarged view for showing in part the reading lead RL and the writing lead WL. The reading lead RL consists of a pair of reading lead wires RW twisted together. Such twisting may be accomplished according to any of conventionally well-known methods. For example, as described in the publication of Japanese published unexamined patent application No. 94042/1995, an adhesive layer may be formed on the outer surface of each lead wire and then two reading lead wires may be fixed by bonding their adhesive layers. The writing lead RL consists of a pair of writing lead wires WW arranged in parallel to each other. Each writing lead wire WW has an insulation layer of polyurethane formed on its outer surface and two writing lead wires WW are integrally formed by fused-bonding their insulation layers. Fused-bonding is an advantageous bonding technique in that it requires no other bonding material such as an adhesive.

Figure 3:
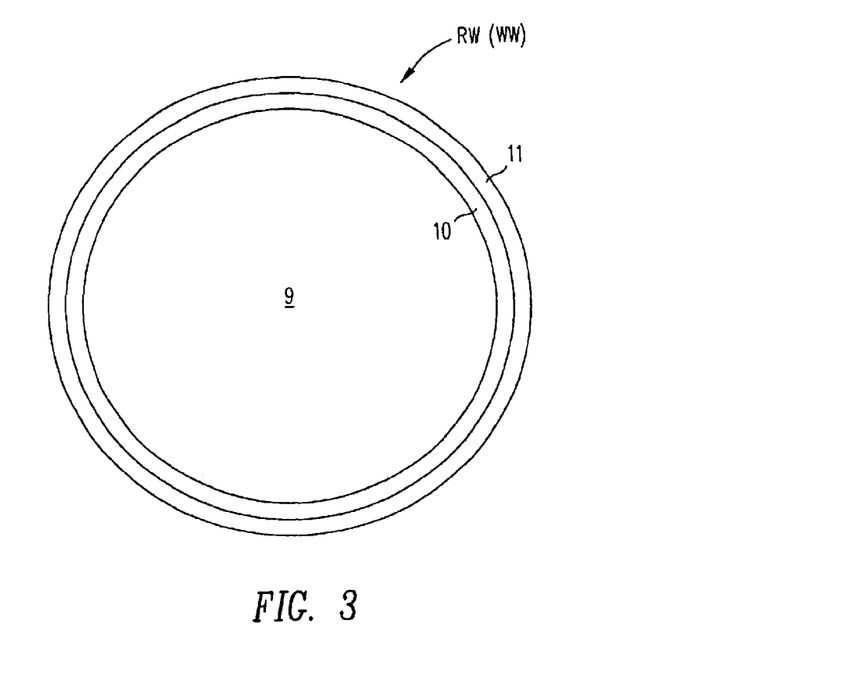
FIG. 3 is a sectional view for showing the configuration of a reading lead wire RW and a writing lead wire WW.

FIG. 3 is a sectional view for showing the configuration of the reading lead wire RW and the writing lead wire WW. As shown in FIG. 3, the reading lead wire RW and the writing lead wire WW have a core wire 9 of oxygen-free copper, an Au layer 10 formed on the outer surface of the core wire 9, and an insulation layer 11 of polyurethane formed on the outer surface of the Au layer 10, respectively. In this way, the reading lead wire RW and the writing lead wire WW have a similar configuration.

Figure 4:
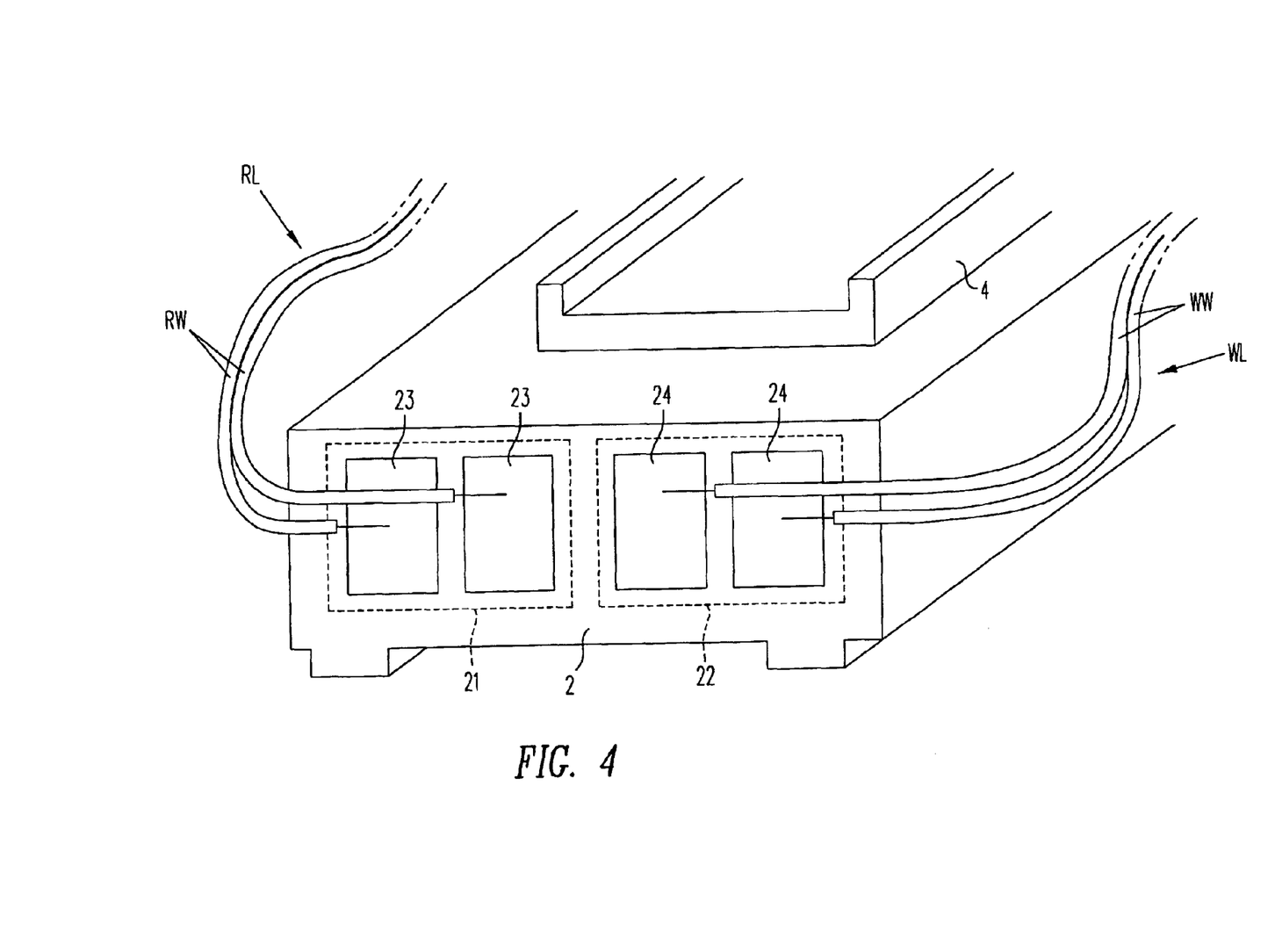
FIG. 4 is an enlarged perspective view for showing the end of a head slider 3 in the magnetic head device 1.

FIG. 4 is an enlarged perspective view for showing the end of the head slider 3. The magnetic head 2 formed on the head slider 3 has a data reading element 21 and a data writing element 22. The data reading element 21 is composed of an MR (magneto resistive) element and the data writing element 22 is composed of a coil. The magnetic head 2 has slider pads 23, 23 electrically connected to the data reading element 21 and slider pads 24, 24 electrically connected to the data writing element 22. The surfaces of the slider pads 23, 23 and the slider pads 24, 24 are Au-plated.

One end of each reading lead wire RW is bonded to one of the slider pads 23, 23 and one end of each writing lead wire WW is bonded to one of the slider pads 24, 24. This bonding is accomplished through a bonding process in which the Au layers 10 of the reading lead wires RW and the writing lead wires WW are bonded to slider pads 23, 23 and the slider pads 24, 24 with ultrasonic vibration. The surface of the magnetic head 2 may be covered with resin after the slider pads 23, 23 and the reading lead wires RW are bonded together and the slider pads 24, 24 and the writing lead wires WW are bonded together.

Figure 7:
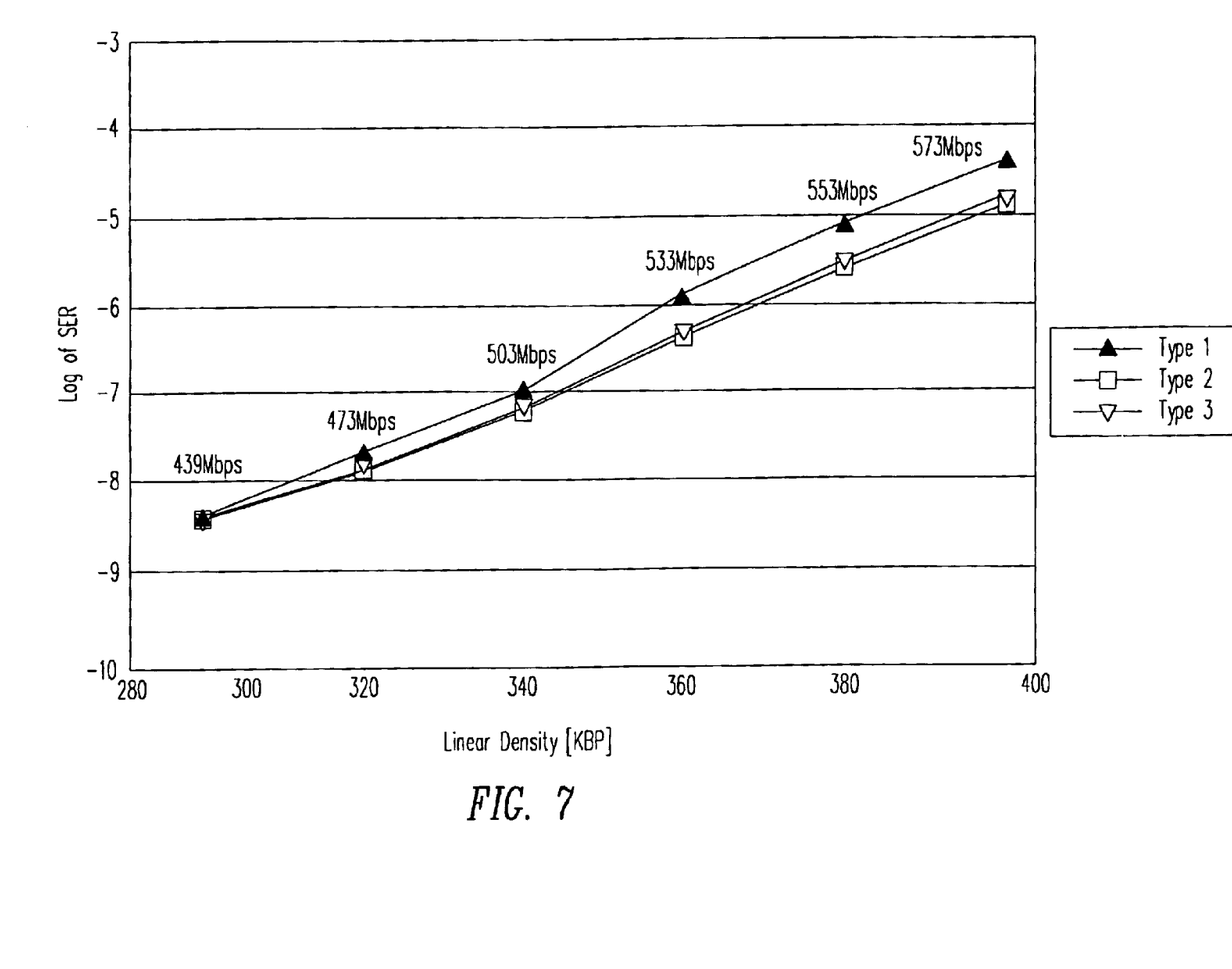
FIG. 7 is a graph for showing the error probability evaluated with respect to the data transfer rate.

In the magnetic head device 1 having the configuration described above, three types of writing leads WL made to the specifications listed below were evaluated in terms of error probability with respect to data transfer rates when the reading operation and the writing operation were repeated. For this evaluation, a reading lead RL made to the specification Type 1 was used. The results are shown in FIG. 7. In the figure, the axis of abscissas designated as "Linear Density (KBP)" indicates recording densities per inch (approximately 25.4 mm) of a hard disk to be used for reading and writing. For the evaluation, a data transfer rate (Mbps) can be obtained, because the hard disk rotates at a constant speed, that is, 10000 rpm. Obtained values are also shown in FIG. 7. The axis of ordinates designated as "Log of SER" indicates error probability. For example, if the value of "Log of SER" is "−8", it means that error may occur only once when the data reading operation and the data writing operation are repeated by $10^8$ times.

|  | Type 1 | Type 2 | Type 3 |
| --- | --- | --- | --- |
| Diameter of core wire 9 | 28.1 μm | 28.1 μm | 28.1 μm |
| Thickness of Au layer 10 | 2.0 μm | 2.0 μm | 1.0 μm |
| Thickness of insulation layer 11 | 5.3 μm | 5.3 μm | 5.3 μm |
| Twisted/Untwisted | Twisted | Untwisted | Twisted |

Figure 6:
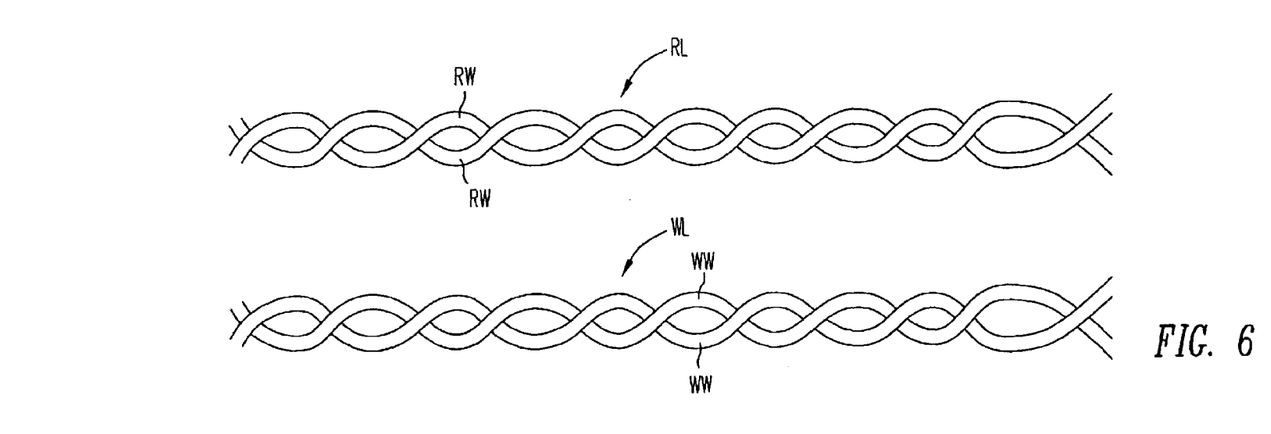
FIG. 6 is an enlarged view for showing in part the reading lead RL and the writing lead WL.

A difference between Type 1 and Type 2 is that the writing lead wires WW of Type 1 are twisted together as shown in FIG. 6, while the writing lead wires WW of Type 2 are untwisted as shown in FIG. 2. When the curves for Type 1 and Type 2 shown in FIG. 7 are compared with each other, it is found that the error probability for Type 2 is lower than that for Type 1 at data transfer rates higher than 439 Mbps. That is, the writing lead wires WW which are untwisted and arranged in parallel to each other exhibit lower error probabilities at higher data transfer rates and thus they can accommodate much higher data transfer rates. On the contrary, the SER values for Type 2 tend to linearly increase up to a data transfer rate of 573 Mbps. It can be easily supposed from this tendency that the writing lead wires WW allow for data transfer rates higher than 600 Mbps.

A difference between Type 1 and Type 3 is that the Au layer 10 in each of the writing lead wires WW of Type 1 has a thickness of 2.0 μm, while the Au layer 10 in each of the writing lead wires WW of Type 3 has a thickness of 1.0 μm. When the curves for Type 1 and Type 3 shown in FIG. 7 are compared with each other, it is found that the error probability for Type 3 is lower than that for Type 1 at data transfer rates higher than 439 Mbps. That is, the writing lead wires WW which have a thinner Au layer 10 exhibit lower error probabilities at the same data transfer rate and thus they can accommodate much higher data transfer rates. At a higher data transfer rate, a signal will be transferred at a higher frequency and then flow along the surface of the writing lead wire WW. Namely, it can be supposed that Type 2 can provide more stable data transfer since it has a thinner Au layer 10 of 1 μm and signals more frequently pass through oxygen-free copper which constitutes the core wire 9 and has excellent data transfer characteristics.

As described above, it has been verified that the writing lead wires WW which are untwisted and arranged in parallel to each other or a thinner Au layer 10 used for bonding to the slider pads 24, 24 can allow the magnetic head device to accommodate higher data transfer rates. In the foregoing, this embodiment has been described with reference to a case where the writing lead wires WW are arranged in parallel to each other and another case where the Au layer 10 is thinned to 1.0 μm. However, it is needless to say that the present invention can be implemented by using the writing lead wires WW arranged in parallel to each other in combination with the thinner Au layer 10 of 1.0 μm. Also, this embodiment has been described with the Au layer 10, by way of example, having a thickness of 1 μm and it should be appreciated, however, that the thickness of the Au layer 10 can be selected from the range below 1.5 μm according to the present invention as described above.

In addition, as described above, the writing lead wires WW in the conventional writing lead WL have been twisted together since this twisting was helpful to improve their noise resistance or to contain the lead wires in the tube 7. This embodiment using untwisted writing lead wires WW may cause the user to feel concern about noise resistance. However, the present invention will assume great significance because it is an enormous challenge to provide a hard disk drive adaptable to higher data transfer rates. Any problem caused by containing the writing lead wires WW in the tube 7 can be easily eliminated by fused-bonding them.

In order to properly transfer signals, any circuit must have sufficient uniformity. Especially, such uniformity is more important for the reading lead RL. If a circuit can keep a constant impedance, it can be said that the circuit has sufficient uniformity. Thus, two types of reading leads RL made to the specifications listed below were evaluated in terms of uniformity in impedance of the reading leads RL.

|  | Type 4 | Type 5 |
| --- | --- | --- |
| Diameter of core wire 9 | 28.1 μm | 28.1 μm |
| Thickness of Au layer 10 | 2.0 μm | 2.0 μm |
| Thickness of insulation layer 11 | 5.3 μm | 2.0 μm |
| Twisting pitch | 0.9 mm | 0.3 mm |
| Twisted/Untwisted | Twisted | Twisted |

Figure 8:
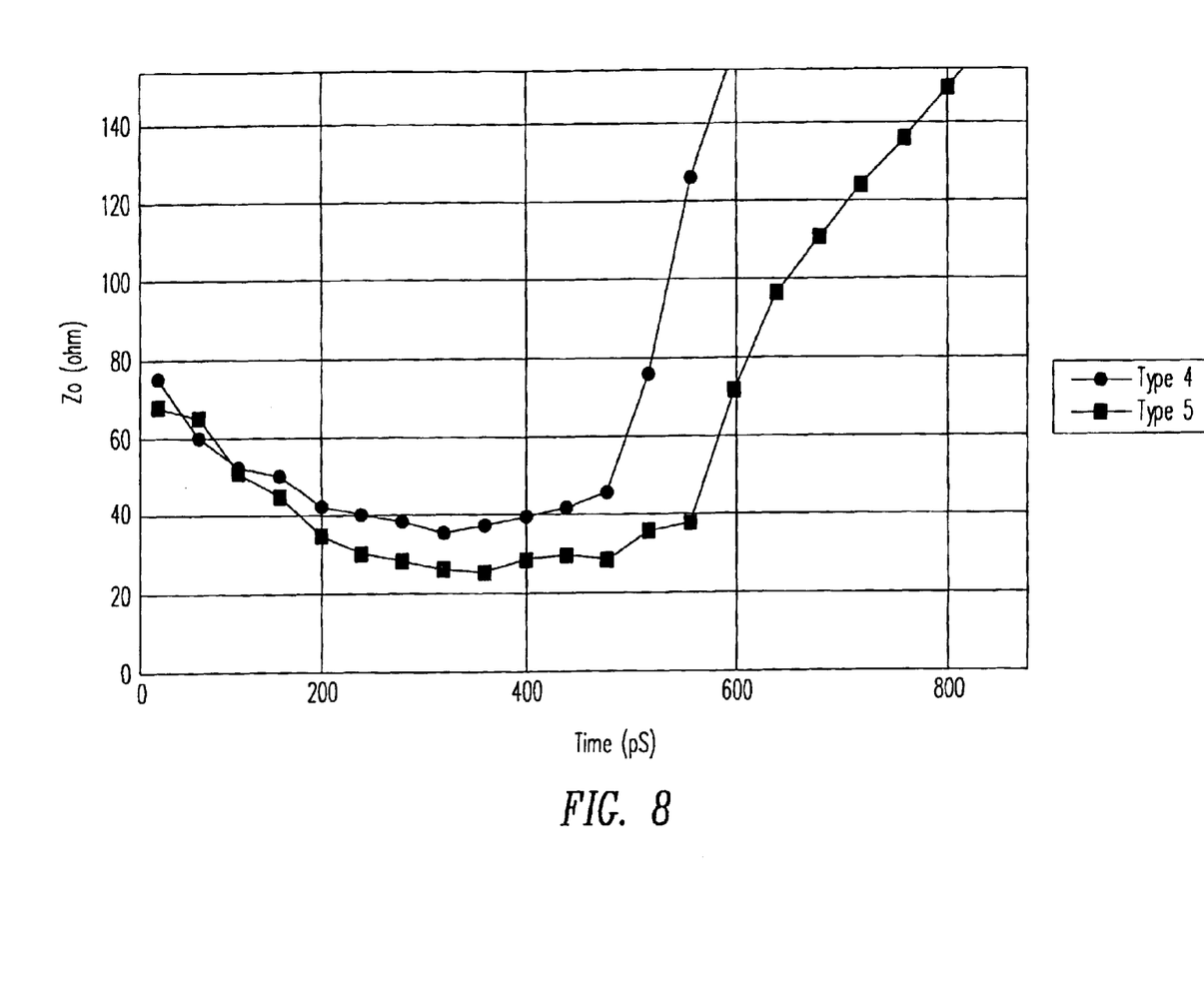
FIG. 8 is a graph for showing the uniformity in impedance of the reading lead RL.

The results are shown in FIG. 8. In the figure, the axis of abscissas indicates time (pica second, pS) and the axis of ordinates indicates impedance Zo (ohm). FIG. 8 shows that a more constant impedance Zo can be kept if a wire exhibits a longer flat portion in its curve or a more delayed rising timing. Therefore, it can be verified that the reading lead RL of Type 5 which has a thinner insulation layer 11 and a smaller twisting pitch is more excellent in circuit uniformity.

It should be appreciated that the reading lead RL of Type 4 is different from the reading lead RL of Type 5 in that the thickness of the insulation layer 11 and the twisting pitch for Type 5 are smaller than those for Type 4. It is intended for reducing the above-mentioned spacing LS that the reading lead RL of Type 5 has a smaller thickness of the insulation layer 11 and a smaller twisting pitch. Specifically, the reading lead RL of Type 5 is smaller than that of Type 4 in spacing LS by approximately 10 μm. This means that the capacitance C of the reading lead RL has been increased. That is, circuit uniformity can be improved by increasing the capacitance C.

As described above, it is very important for the reading operation to increase the capacitance C for improvement of circuit uniformity. On the contrary, it is necessary for the writing operation to suppress the capacitance C for reducing any delay in rise time of input signals. The results shown in FIG. 8 indicate that a thicker insulation layer 11, that is, a smaller capacitance C can be helpful to reduce any delay in rise time. Therefore, as described above, it is desirable that the insulation layer 11 of the writing lead WL is thicker than that of the reading lead RL.

As described above, this embodiment has the reading lead RL and the writing lead WL made to different specifications suitable for their operations, respectively. Therefore, this embodiment can accommodate higher data transfer rates more reliably as compared with the prior magnetic head device which has the reading lead RL and the writing lead WL made to the same specification. In addition, as shown in FIG. 7, the magnetic head device 1 according to this embodiment can be applicable to data transfer rates of 400 Mbps or higher, and more preferably, of 600 Mbps or higher. These data transfer rates are equivalent to or higher than those for the current ILS and can be considered very significant in view of cost advantages.

From the foregoing, the present invention can provide a magnetic head device which can accommodate higher data transfer rates by using lead wires.

We claim:

1. A magnetic head device, comprising:
   a magnetic head slider having a data reading element and a data writing element;
   a first lead for transferring data between said data reading element and external devices, said first lead consisting of a pair of lead wires which are twisted together; and
   a second lead for transferring data between said data writing element and external devices, said second lead consisting of a pair of lead wires which are untwisted but arranged in parallel to each other.

2. The magnetic head device according to claim 1, wherein the spacing between the paired lead wires constituting said first lead is less than the spacing between the paired lead wires constituting said second lead.

3. The magnetic head device according to claim 1, wherein each of the paired lead wires constituting said second lead has an insulation cover layer and the paired lead wires are integrally formed by bonding the respective insulation cover layers.

4. The magnetic head device according to claim 1, wherein said data reading element is a magneto resistive element.

5. A magnetic head device for reading data from and writing data to a magnetic recording medium, comprising:
   a reading element for reading data; and
   a reading lead wire for transferring signals between said reading element and external devices,
   wherein said reading lead wire has a core wire of conductive material and an insulation layer covering the outer surface thereof and having a thickness of 3 μm and wherein two reading lead wires are twisted together to form a reading lead and two writing lead wires are arranged in parallel to each other form a writing lead.

6. The magnetic head device according to claim 5, wherein the thickness of said insulation layer is 1.5 to 2.5 μm.

7. The magnetic head device according to claim 5, comprising a writing element for writing data, and a writing lead wire for transferring signals between said writing element and external devices,
   wherein said writing lead wire has a core wire of conductive material and an insulation layer covering the outer surface thereof and having a thickness of 4 μm or more.

8. The magnetic head device according to claim 5, wherein the twisting pitch for said reading lead wires is 0.5 mm or less.

9. A magnetic head device for reading data from and writing data to a magnetic recording medium, comprising:
   a writing element for writing data; and
   a lead wire for transferring signals between said writing element and external devices,
   wherein said lead wire has a core wire of conductive material, a metal covering layer covering the outer surface of said core wire and having a thickness of 1.5 μm or less for bonding to said writing element, and an insulation layer covering the outer surface of said metal covering layer.

10. The magnetic head device according to claim 9, wherein the thickness of said metal covering layer is 0.5 μm or more.

11. The magnetic head device according to claim 9, wherein said core wire is made of Cu or Ag material.

* * * * *